3,125,601
1-PHENYL, 3-METHOXYMETHYL,
3-METHYL-UREAS
Max T. Goebel, Chadds Ford, Pa., assignor to E. I. du Pont de Nemours and Company, Wilmington, Del., a corporation of Delaware
No Drawing. Filed Aug. 11, 1960, Ser. No. 48,853
1 Claim. (Cl. 260—553)

This invention relates to certain aryl alkyl methoxymethyl substituted ureas. More specifically the compounds of this invention are those represented by the formula

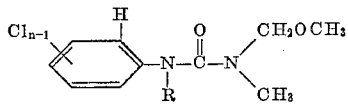

wherein $n$ is a whole positive integer from 1 through 4, that is 1, 2, 3 or 4; and R is selected from the group consisting of hydrogen and methyl.

The urea compounds of this invention can be prepared by the reaction of a substituted urea of the above-described type but not containing the methoxymethyl group in aqueous reaction medium with formaldehyde with a barium hydroxide catalyst. After refluxing briefly the reaction mixture is cooled and a lower oily layer separated. This oil is added to methanol containing hydrochloric acid and stirred briefly. The excess hydrochloric acid and methanol are then evaporated, leaving the desired product.

It has been found that the substituted ureas of the above-described type possess outstanding herbicidal activity. They are most effective as foliar herbicides and pre-emergence herbicides. They are active on a wide variety of weeds including crabgrass, foxtail, pigweed, mustard, ryegrass, Bermuda grass (growing from seed), nutsedge (from seeds and tubers), Johnson grass, and such "simulated" weeds as oats, millet, sorghum and tomato.

Of the above-described compounds, the best from the standpoint of ease and economy of preparation and usage are those compounds wherein R is hydrogen. Thus by way of example, preferred compounds of the present invention are 1 - (p - chlorophenyl)-3-methyl-3-methoxymethylurea, 1-(3,4-dichlorophenyl)-3-methyl-3-methoxymethylurea and 1-phenyl-3-methyl-3-methoxymethylurea.

Herbicidal compositions of the invention are prepared by admixing one or more of the substituted ureas, in herbicidally effective amounts, with a conditioning agent of the kind used and referred to in the art as a pest control adjuvant or modifier to provide formulations adapted for ready and efficient application to soil or weeds (i.e., unwanted plants) using conventional applicator equipment.

Thus the herbicidal compositions or formulations are prepared in the form of solids or liquids. Solid compositions are preferably in the form of dusts and are compounded to give homogeneous free-flowing dusts by admixing the active compound or compounds with finely-divided solids, preferably talcs, natural clays, pyrophyllite, diatomaceous earth or flours such as walnut shell, wheat, redwood, soya bean, cottonseed flours and other inert solid conditioning agents or carriers of the kind conventionally employed in preparing pest control compositions in dust or powder form.

Liquid compositions of the invention are prepared in the usual way by admixing one or more of the substituted ureas with a suitable liquid diluent media. With certain solvents such as alkylated naphthalene, dimethylformamide and cresol, relatively high, up to about 35% by weight or more, concentrations of the active urea compound can be obtained in solution. Other liquids conventionally used in preparing liquid herbicidal compositions are for the most part less effective solvents.

The herbicidal compositions of the invention whether in the form of dusts or liquids preferably also include a surface-active agent of the kind sometimes referred to in the art as a wetting, dispersing or emulsifying agent. These agents which will be referred to hereinafter more simply as surface-active dispersing agents cause the compositions to be easily dispersed in water to give aqueous sprays which for the most part constitute a desirable composition for application.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in detail in an article by McCutcheon in "Soap and Chemical Specialties," volume 31, Nos. 7–10, (1955).

Generally the surface-active agent will not comprise more than about 5 to 15% by weight of the composition depending, of course, upon the particular surface-active agent, the system in which it is placed, and the result desired, and in certain compositions, the percentage will be 1% or less. Usually the minimum lower concentration will be 0.1%.

The herbicidal compositions are applied either as a spray or a dust to the locus or area to be protected from undesirable plant growth, commonly called weeds, i.e., plants growing where they are not wanted. Such application can be made directly upon the locus or area and the weeds thereon during the period of weed infestation in order to destroy the weeds but, if desired, the application can be made in advance of an anticipated weed infestation to prevent such infestation. Thus the compositions can be applied as aqueous foliar sprays and can also be applied as sprays directly to the surface of the soil. Alternatively, the dried powder compositions can be dusted directly on the plants or on the soil.

The active compound is, of course, applied in amount sufficient to exert the desired herbicidal action. The amount of the active substituted ureas present in the compositions as actually applied for destroying, preventing, or controlling weeds will vary with the manner of application, the particular weeds for which control is sought, the purposes for which the application is being made, and like variables. In general, the herbicidal compositions as applied in the form of a spray or a dust will contain from about 0.5% to 85% by weight of substituted urea or a combination of such ureas.

Fertilizer materials, other herbicidal agents, and other pest control agents such as insecticides and fungicides can be included in the herbicidal compositions of the invention if desired.

In order that the invention may be better understood, the following examples are given in addition to the examples already given above. The examples illustrate the preparation of the substituted areas, herbicidal formulations employing such compounds, herbicidal applications, and the results obtained.

EXAMPLE 1

*Preparation of 3-(p-Chlorophenyl)-1-Methoxy-Methyl-1-Methylurea*

A total of 10 parts by weight of 3-(p-chlorophenyl)-1-methylurea and 3 parts by weight of barium hydroxide is added to 50 parts by weight of 37% aqueous formaldehyde solution. This mixture is heated at reflux temperature for a period of 15 minutes or until all of the solid starting urea is converted to an oily immiscible layer. The reaction mixture is cooled to room temperature and the newly formed lower layer is run into 50 parts by weight of methanol containing 1 part by weight of concentrated hydrochloric acid. This methanol solution is heated for several minutes after reflux temperature and then evaporated to dryness. Essentially pure 3-(p-chlorophenyl)-1-methoxymethyl-1-methylurea remains as an oily residue ($n_D^{25}=1.572$).

Analysis.—Calcd. for $C_{10}H_{13}ClN_2O_2$: C, 52.6%; H, 5.7%. Found: C, 51.1%; H, 5.5%.

EXAMPLE 2

*Preparation of 3-(3,4-Dichlorophenyl)-1-Methoxymethyl-1-Methylurea*

A total of 10.5 parts by weight of 3-(3,4-dichlorophenyl)-1-methylurea and 3 parts by weight of barium hydroxide is added to 50 parts by weight by 37% aqueous formaldehyde solution. This mixture heated at reflux temperature for a period of 15 minutes or until all of the solid starting urea is converted to an oily immiscible layer. The reaction mixture is cooled to room temperature and the newly formed lower layer is run into 50 parts by weight of methanol containing 1 part by weight of concentrated hydrochloric acid. This methanol solution is heated for several minutes after reflux temperature and then evaporated to dryness. Essentially pure 3-(3,4-dichlorophenyl)-1-methoxymethyl-1-methylurea remains as an oily residue.

EXAMPLE 3

The following compounds are prepared in accordance with the procedure of Example 1 and Example 2, except substituting for the halophenyl methyl substituted ureas of Examples 1 and 2 the appropriate halophenyl methylureas needed to prepare the following compounds:

3-phenyl-1-methoxymethyl-1-methylurea,
3-(3,4-dichlorophenyl)-1,3-dimethyl-1-methoxymethyl-urea,
3-phenyl-1,3-dimethyl-1-methoxymethylurea,
3-(3,4,5-trichlorophenyl)-1-methoxymethyl-1-methylurea,
3-(2,4,5-trichlorophenyl)-1-methoxymethyl-1-methylurea.

EXAMPLE 4

To demonstrate the herbicidal activity of the compounds of Examples 1–3, they are applied in the form of a spray containing 1% by weight of these compounds to the foliage of tomato plants, Johnson grass seedlings, nutsedge seedlings and Bermuda grass seedlings. It is found that these treatments give good control of these species of vegetation, thereby indicating high foliar activity against both monocotyledonous and dicotyledonous plants.

The pre-emergence activity of these compounds is demonstrated by applying them at the rate of 0.5 to 2.0 pounds per acre in 40 gallons of water to plots infested with a variety of broadleaf and grass weeds. Excellent control is obtained of such weeds as grabgrass, ryegrass, foxtail, pigweed, mustard, and simulated weeds such as oats, millet and sorghum. Excellent post-emergence weed control is also noted. Crop plants such as corn show no visible injury at effective weed killing rates of 0.5 to 1.5 pounds of active ingredient per acre, while sugar cane shows no visible injury at 4.0 pounds of active ingredient per acre.

EXAMPLE 5

The compounds of Examples 1–3 are formulated into water-dispersible powder herbicidal compositions in accordance with the present invention to provide a composition suitable for dispersion in water to give a herbicidal spray. The water-dispersible powder compositions are made by intimately mixing the ingredients listed below using conventional mixing equipment and then grinding the mixture to give a powder having an average particle size less than about 50 microns.

|  | Percent |
|---|---|
| Active ingredient | 75 |
| Fuller's earth | 23.75 |
| Sodium lauryl sulfate, 50% (wetting agent) | 1 |
| Methyl cellulose, 15 cps. (dispersing agent) | 0.25 |

This composition can be used effectively according to the teachings of Example 4.

The compounds of Examples 1–3 are formulated into dust compositions in accordance with the present invention that are adapted for direct application as a dust. These dust compositions are made by blending or mixing the ingredients shown below and grinding the mix to give a composition having an average particle size less than about 50 microns.

|  | Percent |
|---|---|
| Active ingredient | 20 |
| Talc | 80 |

The compounds of Examples 1–3 are formulated into a powdered herbicidal concentrate adapted for use in the preparation of a spray using either an oil, water, or a combination of oil and water as a liquid diluent. The powder concentrates are made by conventional mixing and grinding operations using the materials shown below in the rate proportions indicated.

|  | Percent |
|---|---|
| Active ingredient | 70 |
| Alkylated aryl polyether alcohol (wetting and dispersing agent) | 4 |
| Fuller's earth | 26 |

The compounds of Examples 1–3 are formulated into emulsified oil compositions of the types shown below by thoroughly mixing and dispersing the active ingredient and conditioning agents in the organic diluent.

|  | Percent |
|---|---|
| Active ingredient | 25 |
| Long chain fatty alcohol sulfates (emulsifying agent) | 2 |
| Goulac (dispersing agent) | 3 |
| Kerosene | 70 |

The above formulations of powdered herbicidal concentrates and emulsifiable oil compositions are applied in either water (80 gallons per acre) or herbicidal oil (60 gallons per acre) at rates of 2 to 8 pounds of active ingredient per acre to obtain excellent control of seedling Bermula grass, seedling quackgrass and seedling nutsedge.

This application is a continuation-in-part of prior application Serial Number 724,857, filed March 31, 1958 and now abandoned.

I claim:
A compound of the formula

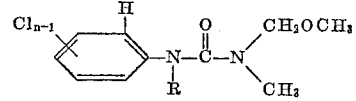

wherein $n$ is a whole positive integer from 1 through 4, and R is selected from the group consisting of hydrogen and methyl.

References Cited in the file of this patent

UNITED STATES PATENTS

| 2,651,620 | Hill et al. | Sept. 8, 1953 |
| 2,870,205 | Beaver et al. | Jan. 20, 1959 |
| 2,876,088 | Hill et al. | Mar. 3, 1959 |
| 2,898,206 | Monoogian | Aug. 4, 1959 |
| 2,960,534 | Scherer et al. | Nov. 15, 1960 |

OTHER REFERENCES

Zigeuner et al.: Monatsheft, vol. 85 (1954), pages 1196–1207 (particularly p. 1200).